US012406443B2

(12) United States Patent
Siejca et al.

(10) Patent No.: US 12,406,443 B2
(45) Date of Patent: Sep. 2, 2025

(54) SYSTEM AND A METHOD FOR HANDLING WEBSITES IN AN EXTENDED REALITY SYSTEM

(71) Applicant: XR WIZARDS SP. Z O.O., Warsaw (PL)

(72) Inventors: Rafal Antoni Siejca, Warsaw (PL); Stanislaw August Komorowski, Warsaw (PL); Tomasz Wojciech Komorowski, Brick, NJ (US)

(73) Assignee: XR WIZARDS SP. Z O.O., Warsaw (PL)

( * ) Notice: Subject to any disclaimer, the term of this patent is extended or adjusted under 35 U.S.C. 154(b) by 0 days.

(21) Appl. No.: 17/858,152

(22) Filed: Jul. 6, 2022

(65) Prior Publication Data

US 2023/0009641 A1   Jan. 12, 2023

(30) Foreign Application Priority Data

Jul. 7, 2021 (EP) ................................ 21461566

(51) Int. Cl.
| | |
|---|---|
| *G06T 19/00* | (2011.01) |
| *G06V 20/20* | (2022.01) |
| *H04L 65/40* | (2022.01) |

(52) U.S. Cl.
CPC ............ *G06T 19/006* (2013.01); *G06V 20/20* (2022.01); *H04L 65/40* (2013.01)

(58) Field of Classification Search
CPC ........ G06T 19/006; G06V 20/20; H04L 65/40
See application file for complete search history.

(56) References Cited

U.S. PATENT DOCUMENTS

| | | | |
|---|---|---|---|
| 11,546,437 B1* | 1/2023 | Bhushan | G06T 19/003 |
| 2020/0192963 A1 | 6/2020 | Lee et al. | |
| 2022/0005275 A1* | 1/2022 | Atlas | G06F 3/0482 |
| 2022/0139251 A1* | 5/2022 | Sweeney-Dillon | G06Q 10/10 |
| | | | 434/238 |
| 2022/0215630 A1* | 7/2022 | Solanki | G06T 19/00 |
| 2023/0239371 A1* | 7/2023 | Edwards | H04L 67/02 |
| | | | 709/227 |

FOREIGN PATENT DOCUMENTS

WO     2007019021 A2    2/2007

\* cited by examiner

*Primary Examiner* — Kee M Tung
*Assistant Examiner* — Khoa Vu
(74) *Attorney, Agent, or Firm* — Rivka Friedman (57) ABSTRACT

An extended reality (XR) system includes an XR server for generating XR environment data for an XR session defined by an XR session identifier; and a client application for operating on an XR device to present an XR environment to a user based on the XR environment data received from the XR server. The client application has a web browser configured to communicate with at least one web server. The web browser of the client application sends to the web server a content request comprising a content identifier and the XR session identifier that defines the XR session presented by the client application. The XR server receives from the web server additional information for the XR session defined by the XR session identifier; and changes the XR environment corresponding to the XR session identifier received from the web server based on the additional information received from the web server.

10 Claims, 7 Drawing Sheets

SYSTEM AND A METHOD FOR HANDLING WEBSITES IN AN EXTENDED REALITY SYSTEM

TECHNICAL FIELD

The present invention relates to handling websites in an extended reality (XR) system. The invention is related to technical fields of data transmission in the Internet web and user interfaces.

BACKGROUND

Virtual reality (VR) environments based on servers using HTTP communication protocol requests are currently gaining popularity as a tool used for functionalization of extended reality (XR) client applications, in response to needs expressed by consumers.

Mobile devices—in particular, impression devices or video devices-deliver information to consumers, for example information about products and their prices or places where particular types of services are offered. The mobile devices may function as a consultant that, can provide optimal recommendations based on user preferences. The mobile devices also allow the consumer to be involved in creating customized products. This allows building relations with clients by matching expectations and increasingly sophisticated needs of the clients. Therefore, state of the art technologies can be used to modify the attitude and behavior of consumers, as well as to build competitive advantage. The increase of the importance of use of extended reality (XR) in building relations between a consumer and a provider (of services or goods) is accompanied by development of technology. Operating system architectures are adapted to the required functionalities.

Such functionalities are usually realized by means of distributed systems (such as client-server, client-multiserver, P2P or middleware architectures) wherein information is processed in various environments using various devices.

One of problems in such distributed systems computing power distribution between many processors that do not share operating memory or computing resources, because each one operates using its own local memory and computing resources. Thereby, the current developments related to this technical field are related to reduction of delays in communication and data transmission and to provide optimal multi-access configurations to increase efficiency, reduce error rate and lower the time of handling particular processes, as well as to optimally distribute tasks for individual servers according to task distribution algorithms (which may include random models, balanced server loading, shortest queuing, etc.).

Indicators of efficiency of that processes may include: task handling time at the server and load of the server, response turnaround time, request queuing and execution time, number of unhandled requests, etc. When designing operating architectures, it should be taken into account that these quality indicators have a stochastic character, therefore they shall be analyzed in terms of expected values taking into account some distribution, and not specific values.

In other words, an optimal solution related to a client-server (or user-server, or multiuser (multiclient)—multiserver) configuration should be such as to meet the expectations while being most efficient and cost-effective.

Several approaches to these problems have been presented in the prior art.

Gammeter S., Gassmann A., Bossard L. in "Server-side object recognition and client-side object tracking for mobile augmented reality" (2010 IEE Computer Society Conference on Computer Vision and Pattern Recognition Workshops, 2010:1-8) describe a system for mobile augmented reality, wherein time delay and corresponding limitations, were reduced by means of movement estimation method which is based on object visual feature multimodal combination in virtual reality and real-time object tracking. In turn, object database capacity limitations on the server side were solved by means of using commercial APIs (Application Programming Interfaces) for product recognition.

Rashid Z., Peig E., Pous R. in "Bringing online shopping experience to offline retail through augmented reality and RFID" (5th International Conference on the Internet of Things, IEEE, 2015:45-51) describe a system for portable devices that enables a combination of online shopping functionality with possibility of creating interaction with products in physical spaces (e.g. in a shop). The architecture of this system consists of two parts—the offline space (physical space) and the online space (AR interfaces). The offline space includes objects provided with RFID (Radio Frequency Identification) system, which comprises antennas connected with a reader via a multiplexer. The reader is connected to a host controlling the RFID system. The online space includes information about objects positioned on shelves, including their exact location. This information is transmitted to the server via the RFID host. User interactions are converted into the physical coordinates and after processing are transmitted to the server, wherein a suitable virtual reality client application performs the operation of translation between the virtual and the physical reality. Time is synchronized by a cloud server, which is connected to the online and offline environments. The user sends an enquiry to the virtual environment by interacting with the physical environment via a client application supporting virtual reality. The result is real object image synthesis (e.g. a shopping shelf with the object positioned thereon) with digital contents of a products database.

Alam M. F., Katsikas S., Beltramello O., Hadjiefthymiades S. in "Augmented and virtual reality based monitoring and safety system: A prototype IoT platform" (Journal of Network and Computer Applications 89, 2017:109-119) present another approach, including a prototype of an IoT system based on a virtual reality (AR/VR). The proposed architecture consists of two parts: a mobile part (such as a headset with a possibility of recording of image, audio and body position) and a server part (including a database) which is responsible for system supervising and controlling. The mobile part provides two functionalities—the possibility of data acquisition and the functionality of a display mounted in a headset. In turn, the server database contains suitable VR and AR scenarios and a system for managing user interaction with said scenarios. This solution is dedicated mainly for educational purposes.

There are also other solutions described in patent documents, which are related to various system integrating methods of the user navigating in virtual reality with the web servers.

For example, CA2354717A1 describes a method of distributing a product that includes creating a virtual representation of the product, including a virtual three-dimensional model of the product, displaying the virtual representation of the product in a virtual world (a virtual city, a shop, a game, a flat). The user computer system connects to the VR server by e.g. clicking a product link and is transmitted to the seller's website where it is possible to obtain detailed product information. In virtual reality it is possible to embed such elements as audio, video or others enabling generating mutual interactions between the VR users.

CA2872756A1 discloses an integrated platform/software system and hardware enabling streaming transmission in real time, which resembles physical shopping so that the user is subject to real-shopping experience. A business architecture diagram is executed via user devices. The server enables shopping procedure realization and provides streaming video transmission.

US2018121997A1 presents a similar solution, but without a streaming video transmission. The system provides online shopping experience and is based on virtual shopping image transmitted from a shopping server to the user device during an online shopping session. The system provides a functionality of navigating in virtual environment and for displaying an avatar. Memory resources are optimized by decreasing the display resolution and not displaying the products that are not in interaction with the avatar. The presented solution does not use elements that can influence content in the VR environment, and is aimed to optimize the computing and to assess parameters related to client engagement.

US2005021472A1 presents a system integration method including organizing and displaying a large amount of content in a manner which may be easily browsed and navigated by the viewer without necessity of using a language or logic elements of the viewer or the network providers. The content can be downloaded from a local disc, a removable disc or any network resource (a local wireless network, a cellular phone network, a wide area network, the Internet). The content displaying devices may have a form of a computer screen, a TV set, a cellular phone, a projector, VR goggles, projection goggles, holographic projectors and the like. Data acquisition (e.g. for displaying in form of advertising) is done via a VR system based on the user preferences, therefore only the user decides what content is to be presented.

All solutions described above are based on specific methods of integration of a virtual and a physical reality environment. In each case, elements browsed in the virtual reality space are dependent on databases and servers that provide the content. User interactions in the virtual space are transformed into physical coordinates and after processing are transmitted to a server, wherein a corresponding application for supporting virtual reality executes a translation between the virtual and physical reality, which may cause delays in access to resources, related to many processes executed in parallel.

SUMMARY OF THE INVENTION

The solutions described in the background section do not suggest a possibility of initiating a connection with an XR server via another server in order to influence objects or an XR environment. Therefore, this creates a gap for new solutions. The quality of user experience could be optimized by improvements in server architecture, such as to skip some steps related to realizing individual procedures initiated by the user within the virtual reality and thereby ensure improvement of resource accessibility, concurrency, scalability, transparency and error tolerance. At the same time, this can reduce load to server computing memory and increase the real server efficiency.

Unlike the prior art solutions described in the background, the XR system does not connect with the web server to download the XR information when it needs it, but it is the web server that connects to XR system at the moment when the web server intends to influence the content presented in the XR system. Thus, in the system presented herein it is the web server that selects the time and the change to occur in the XR system. The XR system does not initiate connections, does not inquire directly the web server nor its database. The XR server provides its XR interface (API) which can be used by the web server (TPWS) to initiate changes in the XR system.

In one aspect, the invention relates to an extended reality (XR) system comprising an XR server configured to generate XR environment data for an XR session defined by an XR session identifier; and a client application configured to operate on an XR device to present an XR environment to a user based on the XR environment data received from the XR server, wherein the client application comprises a web browser configured to communicate with at least one web server. The web browser of the client application is configured to send to the web server a content request comprising a content identifier and the XR session identifier that defines the XR session presented by the client application. The XR server is configured to receive from the web server additional information for the XR session defined by the XR session identifier; and change the XR environment corresponding to the XR session identifier received from the web server based on the additional information received from the web server.

The XR session identifier may have a form of a token that is a hashed version of the XR session identifier.

The client application can be configured to handle a plurality of XR sessions simultaneously.

The XR session identifier can be provided as a parameter in a string sequence that determines a content identifier in the XR address.

The XR session identifier can be provided as an additional parameter added to a GET call or to a POST call.

The additional information can be selected from a group consisting of: controlling information for the XR system, a 2D image to be placed in the XR environment; a 3D object model to be placed within the XR environment; information about changing features of an object presented within the XR environment or a state of said object; a sound to be played; a stream to be played; a fragrance to be emitted; a haptic element; various assets and gadgets or changes associated therewith.

The XR server can be configured to convert the received additional information into a format and a mode supported by the client application.

The web server can be a dedicated server for supporting web pages for the XR environment and the web browser is configured to redirect website content request from the address provided by the user to the dedicated web server address.

The system may further comprise at least one web server configured to generate, in response to receiving from the web browser of the client application the content request and the XR session identifier, additional information for the XR session defined by the XR session identifier and transmit the additional information along with the XR session identifier to the XR server In another aspect, the invention relates to a web server configured to communicate with the XR system as described herein, wherein the web server is configured to send, in response to the content request received from the web browser comprising as a parameter the XR session identifier, additional information related to the XR environment data for presentation within a session handled by the client application having said XR session identifier and/or its own business and integration rules.

The term "extended reality (XR) system" as used herein refers to a virtual reality (VR) system, augmented reality (AR) system, mixed reality (MR) system, and the like, which provide interaction between a computer and a user.

The XR server is a local user device (e.g. a personal computer or a smartphone) or a remote device (such as a cloud server) that generates XR data. The XR server may be controlled by a suitable Application Program Interface (API) by means of which certain commands for the XR server may be issued, such as to generate particular multimedia objects in the XR environment (static or moving), to change the environment, to provide information concerning XR objects or process status.

The XR data generated by the XR server are received by a client application that handles the device for presenting the XR environment to the user, such as virtual reality goggles, extended reality goggles, a hologram display, a tablet with an XR application, contact lens with extended reality functionality, a projector that projects an image onto a retina etc. The device may be connected to one or more input interfaces that enable the user to control the device, such as a keyboard, mouse, touchpad, joystick, 3D controller, gloves, eye-tracker and the like.

One of the functionalities provided by the client application is a web browser, wherein the user may input website addresses to browse the websites within the XR environment. The web browser may be one of known browsers, e.g. Chrome, Firefox, Opera, Edge with a suitable add-on enabling the functionality of system described herein or with a dedicated browser suitable for handling the XR system as described herein.

When the client application operates, the environment presented to the user has a particular XR session identifier assigned. A single XR device may simultaneously generate several "worlds", i.e. different XR sessions between which the user may select or within which the user may participate simultaneously.

When, within a particular XR session, the user runs the web browser and inputs a website address to be browsed, the browser sends a content request to the web server. That request, besides typical parameters (such as a content identifier (e.g. an URL address)) contains an XR session identifier provided in a direct form or a pre-processed form. For example, the XR session identifier may be pre-processed to a form of a so-called token, which can be hashed (encrypted) form of the XR session identifier (which is advantageous, in particular, in a case when the XR session identifier contains data allowing a session or a user to be identified, when the user does not wish to provide these data to third parties). The XR session identifier is provided in a specific format that is easy to be identified. For example, instead of a standard request containing the URL address only, e.g. "https://www.SITE1.com/index.html" (wherein www.SITE1.com defines a website address with the content), the content request may have the form of https://www.SITE1.com/index.html?xrsid-8746329864928367 (wherein 8746329864928367 is the XR session identifier provided as a parameter called xrsid).

In one of possible embodiments, the web server is configured to handle websites for XR environment and contains alternative versions of standard websites or web services or additional enhancing elements. In such case, the web browser is adapted to redirect the website content request from the URL address provided by the user (e.g. https://www.SITE1.com/index.html) to the dedicated web server 2 address followed by the XR session identifier (e.g. https://www.SITE2.com/index.html?xrsid=8746329864928367).

The traffic may be redirected also in other known manners of traffic redirecting.

Preferably, the content request is formatted such that if it reaches a web server which is handling standard content only and is not adapted to cooperate with the XR system as described herein, that server may ignore the XR session identifier and return typical website content to the web browser. For example, the request is formatted as a parameter in a sequence of characters defining the content identifier in the URL address, e.g. as a sequence ?xrsid=12345678"—therefore, a server that does not handle such parameter will not take any additional action related to this parameter.

The XR session identifier may be transmitted as an additional parameter added to a GET call or a POST call or in any other way.

The web server (also called a Third Party Web Server, TPWS), may be a typical server providing content identified by URL address and generating additional content, e.g. as a result of responding to queries directed to a database, e.g. an SQL database.

If the content request reaches a web server which is adapted to cooperate with the XR system described herein, that server may send a typical website to the web browser and simultaneously send additional information to the XR server. The web server may be configured to communicate only with a particular XR server, then it knows the IP address or the domain name thereof. Alternatively, the web server may be configured to communicate with various XR servers supported by various XR content providers, then it decides about which XR server to communicate with based on a parameter name that defines the XR session identifier or based on an additional parameter which may define the IP address or the domain of the XR server. The XR server address may be also provided by an additional proxy server.

The additional information sent by the web server to the XR server is transmitted in accordance with a format defined by the API of the XR server. The web server knows the API specification of the particular XR server and knows how to send (e.g. in what format) additional information to the XR server. The XR session identifier corresponding to the XR session identifier transmitted by the web browser is transmitted together with said additional information. In this manner, said additional information may be assigned to the environment in which the web browser is launched. When receiving said additional information, the XR server generates corresponding XR environment data and sends these data to the client application in accordance with the XR session identifier.

For example, the additional information may include:
- a control information for the XR system (e.g. instructions causing transfer of the user associated with the session to a particular interior or scene in the XR environment (e.g. after logging to a shopping website or after changing a shopping department) or in response to adding a product to the shopping basket in a furniture shop, placing this product in a virtual representation of the room which is being furnished during the shopping);
- a 2D image to be placed in the XR environment;
- a 3D object model to be presented within the XR environment;
- an information about a change of the object features presented within the XR environment or the state in which it is found;

1 a sound to be played;
    a stream to be played;
    a fragrance to be emitted;
    a haptic element that causes e.g. a vibration of a touch controller or a change of temperature of the controller;
    various assets and gadgets or changes thereof which influence the XR environment behavior.

The additional information is transmitted in a form compliant with the API of a particular XR server, which may define e.g. allowed formats of transmitted information (such as a 2D image format (e.g. jpg, bmp, png) or a 3D model format (e.g. obj, fbx), provide methods and functions allowing content in the XR environment to be controlled and status thereof to be verified), and parameters thereof (such as location of a 3D object in space or the timing of playing a sound or a parameter determining an event on which the information presentation depends).

When the XR server transforms the additional information into XR environment data, it converts it to a format and a mode supported by the particular XR device and the client application running thereon, e.g. requiring to provide the object in a defined format or resolution.

Therefore, it is possible to use a relatively universal API to support many different XR devices by a single XR server.

In a system configured in such a way, it is the web server that initiates communication with the XR system. The XR system informs only the web server (preferably, in manner that does not influence operation of the web servers not configured to cooperate with this XR system) about the fact that the content request directed to the web server originates from the XR system. When the web server identifies a possibility and a need for communication with the user not only by the website content but also by the XR environment, it may send additional information to the XR server which will influence the XR presented to the user, e.g. changing the environment, objects, features thereof, generating events to be handled by the system within the same XR session, in which browser is handled from which the content request to the web server was called. Owing to this, when the user browses traditional website within the XR environment, at the same time within the XR environment additional content (e.g. objects, events, interactions) may be generated that are correlated with actions taken at the browsed website.

Such solution enables easy adaptation of existing web services for use with the XR system. For example, the base service functionality such as that of an online shop may be realized in standard manner by the web browser (e.g. logging to the shop, providing address data for delivery, payment processing). Whereas, additional functionality may be realized by means of the XR sever (e.g. presenting article details in the shop by projecting a 3D model thereof in the XR environment or allowing interaction between the user and a consultant avatar generated in the XR environment).

Such additional functionality may be implemented as an extension of the existing web servers by installing additional modules or extensions thereon, which are activated upon detection that the content request contains an XR session identifier. It is applicable also to any kind of services, such as CMS systems, online shops, auction and transaction engines and the like. For example, this functionality may be realized by means of theme extensions in a popular WordPress system.

The presentation of content from the web server is thus entirely initiated by the web server and does not require any additional actions at the XR server part other than providing the XR session identifier by the web browser. Owing to this, it is not necessary to adapt the XR server to specific requirements that could be posed by the web servers.

The presented system facilitates communication of the web server with the user through the XR environment such that the web server communicates only with the XR server and not with the client application executed at the XR device. Thus, it is sufficient for the web server to be adapted to interact with the XR server's API and it does not need to be able to interact with various user devices—it is the XR server that must provide such capability. Thereby, the system development is facilitated, because each system component is responsible for its strictly defined area—the task of the web server provider is to ensure compatibility with the XR server API and the task of the XR server provider is to ensure compatibility with the XR devices on which client applications are launched.

Interfacing with the XR environment may require relatively large resources on the web server's part and thus the web server may not be capable to handle a high number of connections from the XR system part. In such a case, the users for which the web server is not able to provide additional information for the XR system may receive a typical website through the web browser in a standard manner. Whereas, the web server may select in standalone manner depending on available resources, with which user to interact not only via the website but also via XR environment. For example, the web server may initiate user communication with a human salesperson (an employee of the online shop) via an XR avatar controlled by this salesperson, and in such a case the web server may send a request to the XR server to generate the salesperson XR avatar only for the selected user/XR session (e.g. depending on the user profile or interaction history with the website). The XR system does not need to possess any information on the subject of action logic of website supporting the web server and it is the website supporting the web server that decides about the further interaction with the user. Namely, the website supporting the web server decides about when and how to change communication method with the user via the XR system—this does not require to implement any changes on the XR server part. The interaction via the XR system may be independent from other content on the website, and thus the content presented on the website and in the XR system may be changed independently of each other.

Furthermore, the communication sent from the user is transmitted directly between the web browser and the web server without the XR server intermediation. Thus, the XR server operator doesn't know the messages sent from the user—this further increases the communication safety, since confidentiality of data sent from the user to the web server is maintained (which may be further encrypted for additional increase of safety). For example, when a user logs to a web server, the user authentication data are not transmitted via the XR server.

Furthermore, it is not necessary for the XR system operator to store any information about a user who received the XR data, it is sufficient that these data will be transmitted by the operator to the XR session of a particular XR session identifier provided by the web server.

The system described herein uses communication, computing and storage resources in the network between the XR server and the web server in an optimal manner. The web server receives only content requests sent from the user in a format extended only by XR session identifier. There is no need for the user to generate any further detailed information associated with the XR system. In contrast, the web server may generate additional XR information for the XR server only if it has a business need and/or free resources to support XR system. In such a case, the additional information related to the XR environment is transmitted in the network only for those sessions which may be supported and thus, redundant data that would not be utilized by anybody are not generated, as is commonplace in various other systems.

All the above described advantages enable fast and efficient, as well as gradual implementation of the XR system described herein, so that it can be used simultaneously by the users utilizing XR devices and also by the users not having these devices, as well as by parties supporting the web servers that are both adapted and not adapted to cooperate with this XR system.

These and other features, aspects and advantages of the invention will become better understood with reference to the following drawings, descriptions and claims.

BRIEF DESCRIPTION OF THE DRAWINGS

Various embodiments are herein described, by way of example only, with reference to the accompanying drawings, wherein.

DETAILED DESCRIPTION OF EMBODIMENTS

Figure 1:
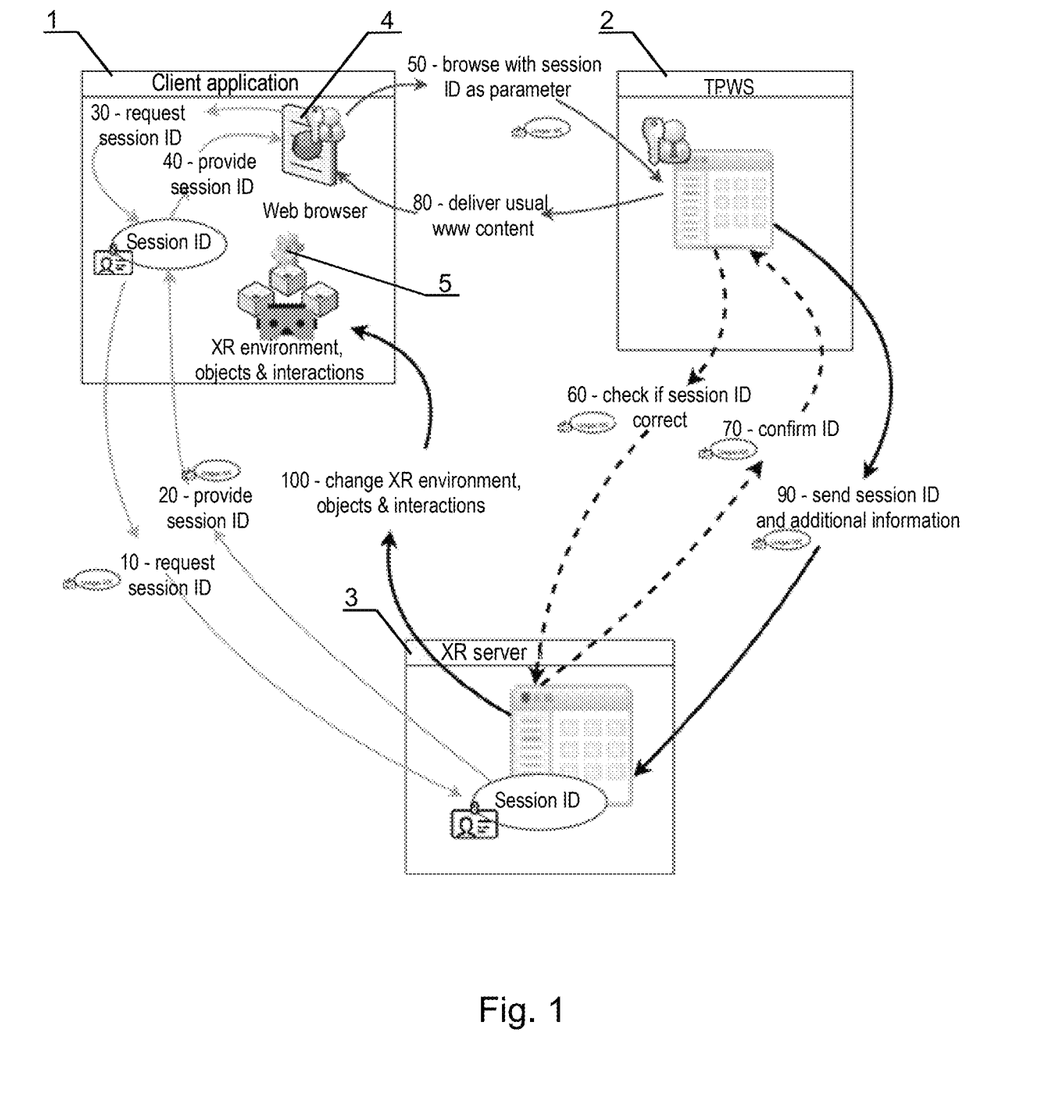
FIG. 1 shows a functional diagram of an embodiment of the XR system.

The following detailed description is of the best currently contemplated modes of carrying out the invention. The description is not to be taken in a limiting sense, but is made merely for the purpose of illustrating the general principles of the invention. FIG. 1 shows a functional diagram of an embodiment of the extended reality (XR) system.

A client application 1 supports a device for presenting an XR environment to the user, e.g. head-mounted goggles (a headset). Data 5 determining the XR environment are generated by an XR server 3. The generated XR environment has its own session identifier. One of the client application 1 modules is a web browser 4 that enables communication with a web server 2 from which website content is downloaded.

The main actions taken by individual system modules are indicated by signs 10-100. When a user intends to launch the web browser in the client application 1, the client application sends an enquiry to the XR server in step 10 for an identifier of the currently executed XR session and reads this XR identifier in step 20. After launching the web browser 4, when the user wants to open a particular website, the web browser 4 sends an enquiry to the client application 1 about the XR session identifier in step 30 and reads this identifier in step 40. Then, the web browser 4 sends a content request to the web server 2 in step 50, along with the XR session identifier. The web server 2 that is configured to support the system described herein provides the requested website in a typical form to the web browser 4 in step 80 and also sends the XR session identifier together with the additional information to the XR server 3 in step 90. The XR server 3 generates and sends data of the XR environment to the client application 1 based on said additional information obtained from the web server 2 for the XR session supported by the client application 1 with said XR session identifier in step 100. Optionally, before sending the additional information in step 90, the web server 2 may send to the XR server 3 an enquiry in step 60, whether the particular XR session identifier is correct and only after obtaining a confirmation of the identifier in step 70 it may proceed to step 90.

Figure 2:
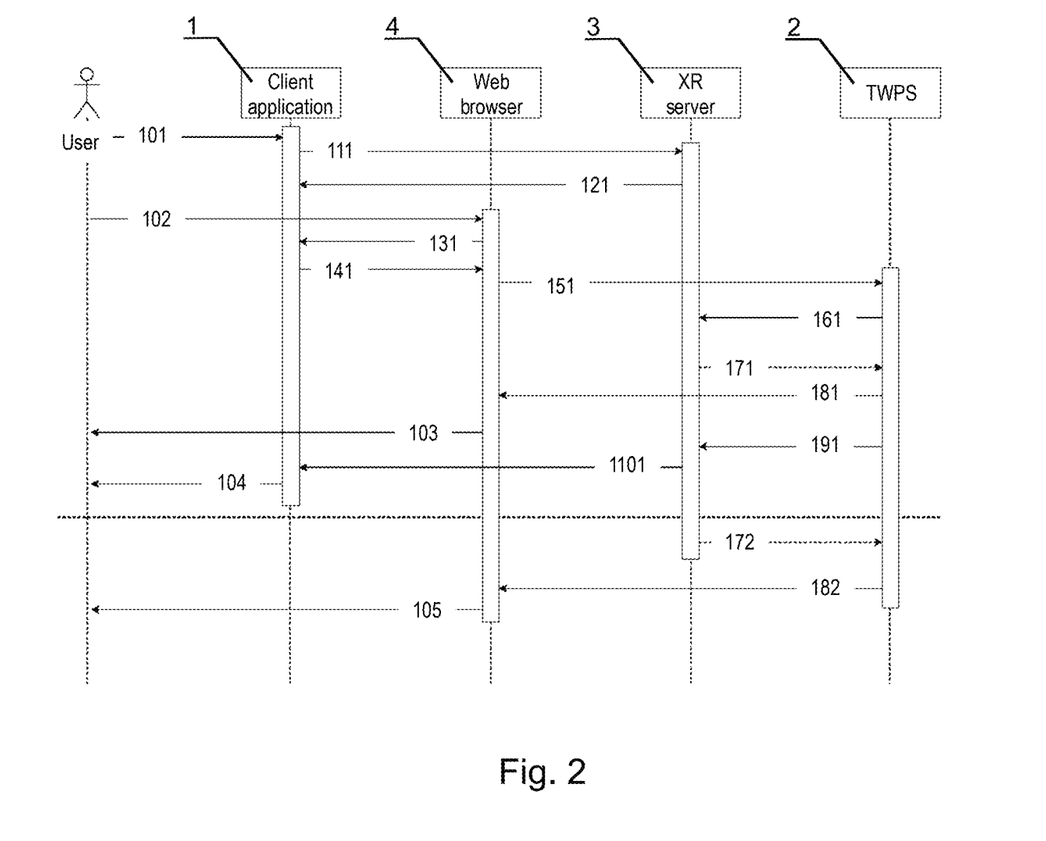
FIG. 2 shows a first detailed embodiment of a method for handling websites.

FIG. 2 shows a first detailed embodiment of a method for handling websites in the XR system. The numbering of the reference signs is organized as follows: the first digit "1" indicates that it is a step of the first embodiment. The last digit indicates a sub-number of a particular step. The digit or two digits between the first and the last digit refer to the steps shown in FIG. 1, thus e.g. references 181, 182 relate to the sub-numbers of the overall step 80 of FIG. 1.

The procedure begins in step 101 when the user enters the XR environment. The client application 1 sends an enquiry for a session identifier to the XR server 3 in step 111, which sends back the XR session identifier in step 121. In step 102 the user activates the web browser in XR environment and inputs a requested content URL identifier. Then, the web browser 4 sends an enquiry for the XR session identifier to the client application 1 in step 131 and receives said identifier in step 141. The web browser 4 adds an XR session identifier to the URL address and sends a content request to the web server 2 in step 151. Upon receiving said request, the web server 2 sends an enquiry whether that particular XR session identifier is correct to the XR sever in step 161. If the web server 2 receives confirmation of correctness in step 171, it sends the standard website content to the web browser 4 in step 181, which is then displayed by the web browser 4 in a standard manner in step 103. Furthermore, the web server 2 sends the XR session identifier along with additional information to the XR server 3 in step 191. Upon receiving this information, the XR server 3 sends to the client application 1 information about objects, content and interactions which should be presented in the XR environment in step 1101. This information is presented to the user by the client application 1 in step 104. Whereas, if the web server 2 receives information that the particular XR session identifier is not confirmed as correct in step 172, then it sends content prepared for situation in which the XR session identifier was not confirmed to the web browser 4 (for example, communication related to XR session error). The web browser presents to the user the website received from the web server in step 105.

Figure 3:
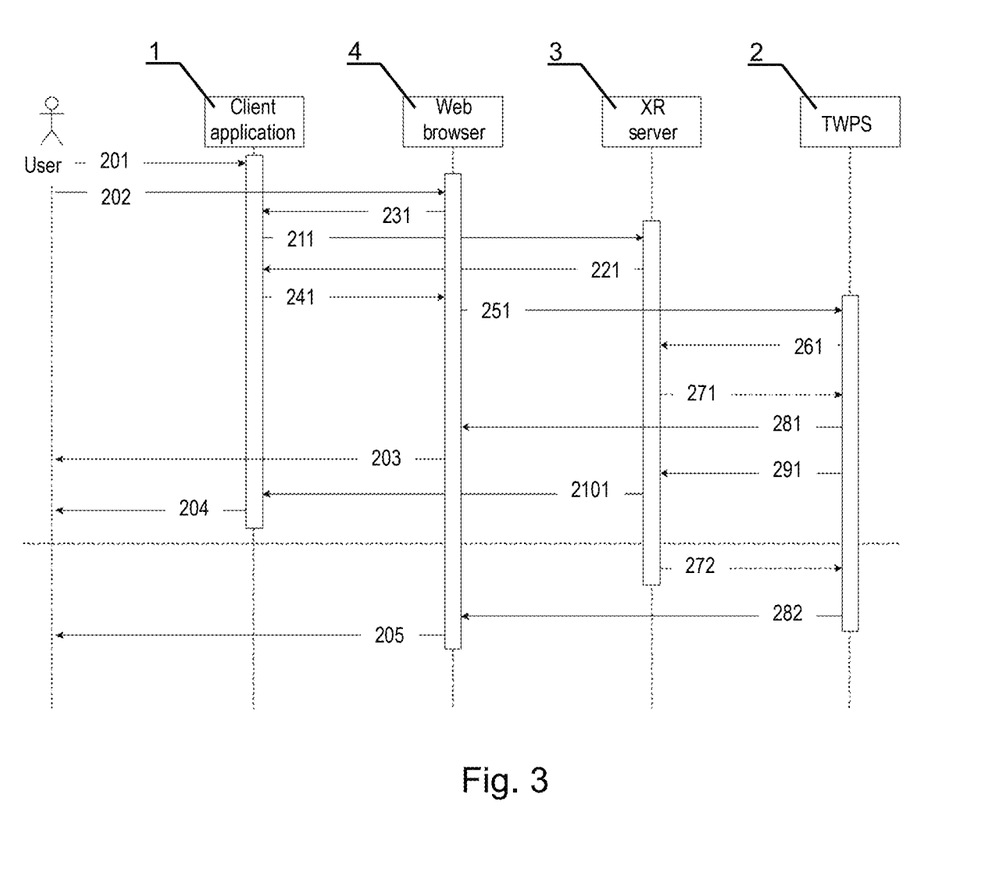
FIG. 3 shows a second detailed embodiment of a method for handling websites.

FIG. 3 shows a second detailed embodiment of a method for handling websites in the XR system. The first digit "2" of reference signs indicates that they relate to a step of the second embodiment, while the remaining digits have their meaning equivalent to what was discussed with reference to FIG. 2.

The procedure begins in step 201, when the user enters the XR environment. The user activates the web browser in the XR environment in step 202 by providing the requested content URL identifier. Then, the web browser 4 sends an enquiry for the XR session identifier to the client application 1 in step 231. The client application 1 sends an enquiry for the session identifier to the XR server in step 211, which returns the XR session identifier in step 221. Then, the client application returns the XR session identifier to the web browser in step 241. The further steps: 251, 261, 271, 281, 203, 291, 2101, 204, 272, 282, 205 are equivalent to steps 151, 161, 171, 181, 103, 191, 1101, 104, 172, 182, 105 discussed with reference to FIG. 2.

Figure 4:
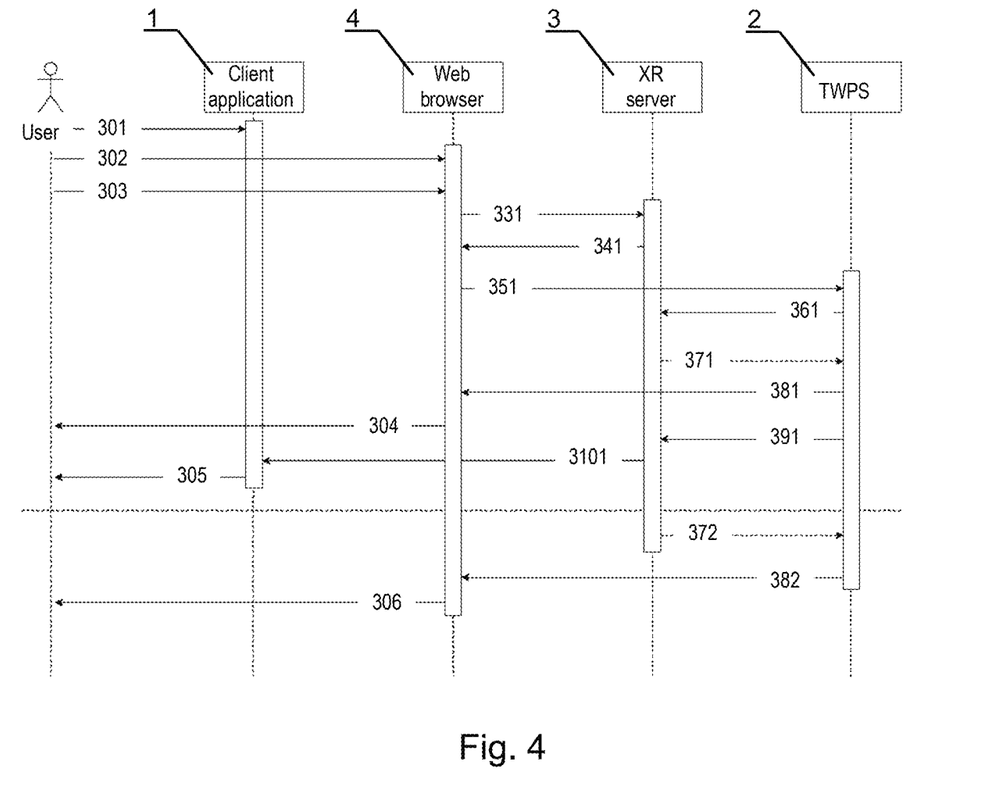
FIG. 4 shows a third detailed embodiment of a method for handling websites.

FIG. 4 shows a third detailed embodiment of a method for handling websites in the XR system. The first digit "3" of reference signs indicates that they relate to a step of the third embodiment, while the remaining digits have their meaning equivalent to what was discussed with reference to FIG. 2.

The procedure begins in step 301, when the user enters the XR environment. The user activates the web browser in the XR environment in step 302 and provides the URL identifier of the requested content in step 303. The web browser 4 sends an enquiry for the XR session identifier directly to the XR server 3 in step 331 and receives the XR session identifier directly from the XR server in step 341. The further steps: 351, 361, 371, 381, 304, 391, 3101, 305, 372, 382, 306 are equivalent to steps: 151, 161, 171, 181, 103, 191, 1101, 104, 172, 182, 105 discussed with reference to FIG. 2.

Figure 5:
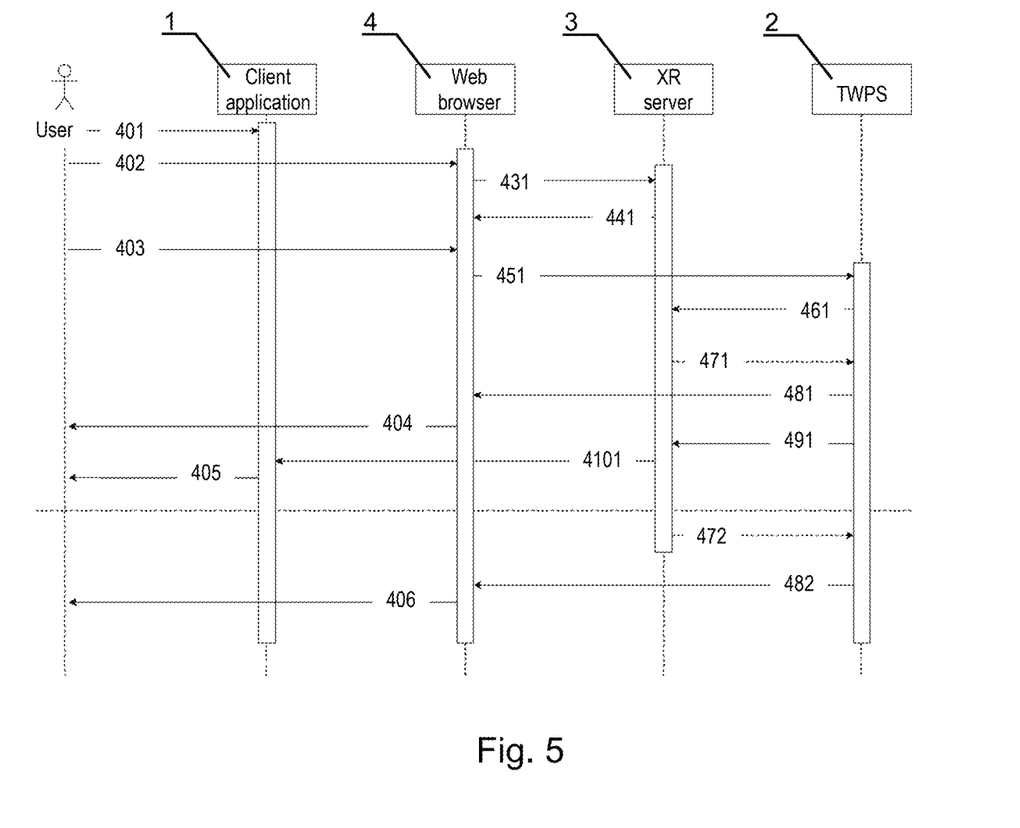
FIG. 5 shows a fourth detailed embodiment of a method for handling websites.

FIG. 5 shows a fourth detailed embodiment of a method for handling websites in the XR system. The first digit "4" of reference signs indicates that they relate to a step of the fourth embodiment, while the remaining digits have their meaning equivalent to what was discussed with reference to FIG. 2.

The procedure begins in step 401, when the user enters XR environment. The user activates the web browser in the XR environment in step 402. The web browser 4 sends an enquiry for the XR session identifier directly to the XR server 3 in step 431 and receives the XR session identifier directly from the XR server in step 441. The user provides the requested content URL identifier in step 403. The further steps: 451, 461, 471, 481, 404, 491, 4101, 405, 472, 482, 406 are equivalent to steps: 151, 161, 171, 181, 103, 191, 1101, 104, 172, 182, 105 discussed with reference to FIG. 2.

Thus, the embodiments presented in FIGS. 2-4 present different kinds of possible communication schemes between the client application 1, the web browser 4 and the XR server 3.

Figure 6:
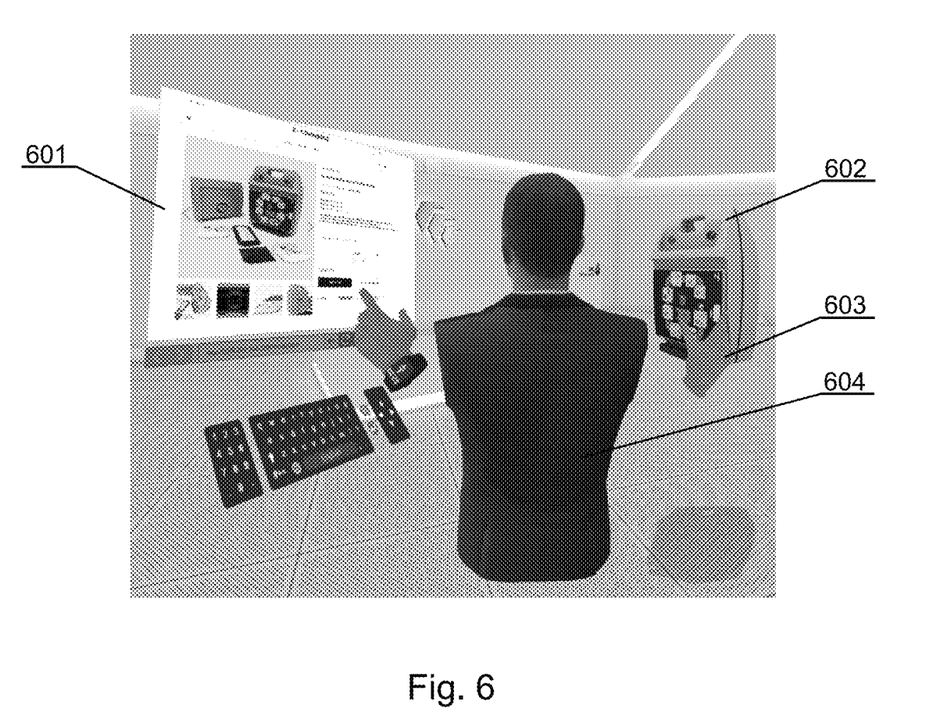
FIG. 6 a shows a first example of an XR environment interface.

FIG. 6 shows a first example of the XR environment interface. In the client application 1 a web browser 4 is launched wherein the user provided an online shopping site address. The screen 601 presents the online shopping website standard interface. Suppose that the user selected a particular product from the shop offer on the website. In such a case, the web server 2 sends additional information to the XR server 3 that represents a 3D model of the selected product and the XR server 3 modifies the XR environment such that the user is presented with a 3D model representation 602 of the selected device, in the XR environment next to the screen 601 of web browser, wherein the 3D model may be handled by means of a dedicated interface, e.g. manually via the user virtual avatar 604.

Figure 7:
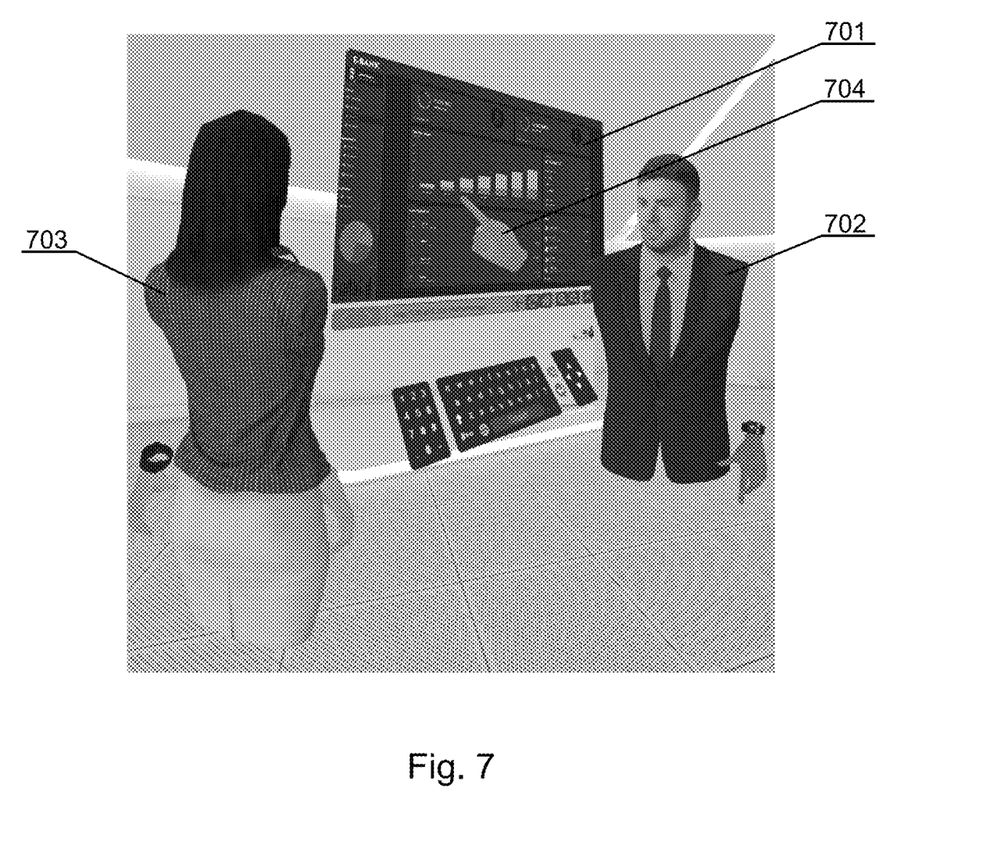
FIG. 7 shows a second example of an XR environment interface.

FIG. 7 shows a second example of the XR environment interface. In the client application 1 a web browser 4 is launched wherein the user provided a bank site address. The screen 701 presents a bank website standard interface. In addition, the web server 2 sends additional information to the XR server 3 that represents a bank consultant avatar 702 which can enter into a discussion related to the offers of the bank with a virtual user avatar 703, wherein the hands 704 of the avatar 702 may point to the currently discussed questions on the website 701.

Yet further system embodiments can be implemented. For example, assuming the web browser 4 is used to access a furniture shopping site and the user selects a room arrangement department, the user may select a piece of furniture and position it over a room plan. The web server 2 may send a new position of the piece of furniture to the XR server. The XR server 3 may place the furniture in the new XR environment and send information to the client application 1 to present the furniture in a corresponding position within the XR environment. The user may select various colors of the furniture at the website, and upon each choice, the web server 2 may send information on the selected color to the XR server 3, wherein the XR server 3 effects a color change of the furniture within the XR environment of the client application 1. After the user selects a particular furniture piece, the web server 2 may information on the selected furniture to the XR server 3, which provides additional information to the client application 1 in a form of a 3D model which can be manipulated by the user in the XR environment, e.g. furniture doors can be opened to check how it impacts the organization of space in a virtual room.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. An extended reality (XR) system comprising:
an XR server configured to generate XR environment data for an XR session defined by an XR session identifier; and
a client application configured to operate on an XR device to present an XR environment to a user based on the XR environment data received from the XR server, wherein the client application comprises a web browser;
wherein the web browser of the client application is configured to:
communicate with a separate web server, the separate web server being separate from the XR server and from the client application,
send, to the separate web server, via a standard Hypertext Transfer Protocol (HTTP)-based content request, a content request comprising:
a content identifier that identifies requested HTTP-based content, and
the XR session identifier that defines the XR session presented by the client application, and
receive, from the separate web server, HTTP-based content corresponding to the content request; and
wherein the XR server has an application program interface (API) and is configured to:
receive, from the separate web server, via the API, additional information associated with the XR session defined by the XR session identifier comprised in the content request sent by the web browser to the separate web server, and
modify the XR environment corresponding to the XR session identifier received from the separate web server based on the additional information received from the separate web server.

2. The system according to claim 1, wherein the XR session identifier has a form of a token that is a hashed version of the XR session identifier.

3. The system according to claim 1, wherein the client application is configured to handle a plurality of XR sessions simultaneously.

4. The system according to claim 1, wherein the XR session identifier is provided as a parameter in a string sequence that determines a content identifier in the XR address.

5. The system according to claim 1, wherein the XR session identifier is provided as an additional parameter added to a GET call or to a POST call.

6. The system according to claim 1, wherein the additional information is selected from a group consisting of: controlling information for the XR system, a 2D image to be placed in the XR environment; a 3D object model to be placed within the XR environment; information about changing features of an object presented within the XR environment or a state of said object; a sound to be played; a stream to be played; a fragrance to be emitted; a haptic element; various assets and gadgets or changes associated therewith.

7. The system according to claim 1, wherein the XR server is configured to convert the received additional information into a format and a mode supported by the client application.

8. The system according to claim 1, wherein the web server is a dedicated server for supporting web pages for the XR environment and the web browser is configured to redirect website content request from the address provided by the user to the dedicated web server address.

9. The system according to claim 1, further comprising at least one web server configured to generate, in response to receiving from the web browser of the client application the content request and the XR session identifier, additional information for the XR session defined by the XR session identifier and transmit the additional information along with the XR session identifier to the XR server.

10. A web server configured to communicate with the XR system according to claim 1, wherein the web server is configured to send, in response to the content request received from the web browser comprising as a parameter the XR session identifier, additional information related to the XR environment data for presentation within a session handled by the client application having said XR session identifier and/or its own business and integration rules.

* * * * *